July 25, 1944.   H. C. KEMPER ET AL   2,354,266
MACHINE TOOL RAPID TRAVERSE MECHANISM
Filed Dec. 10, 1942   6 Sheets-Sheet 1
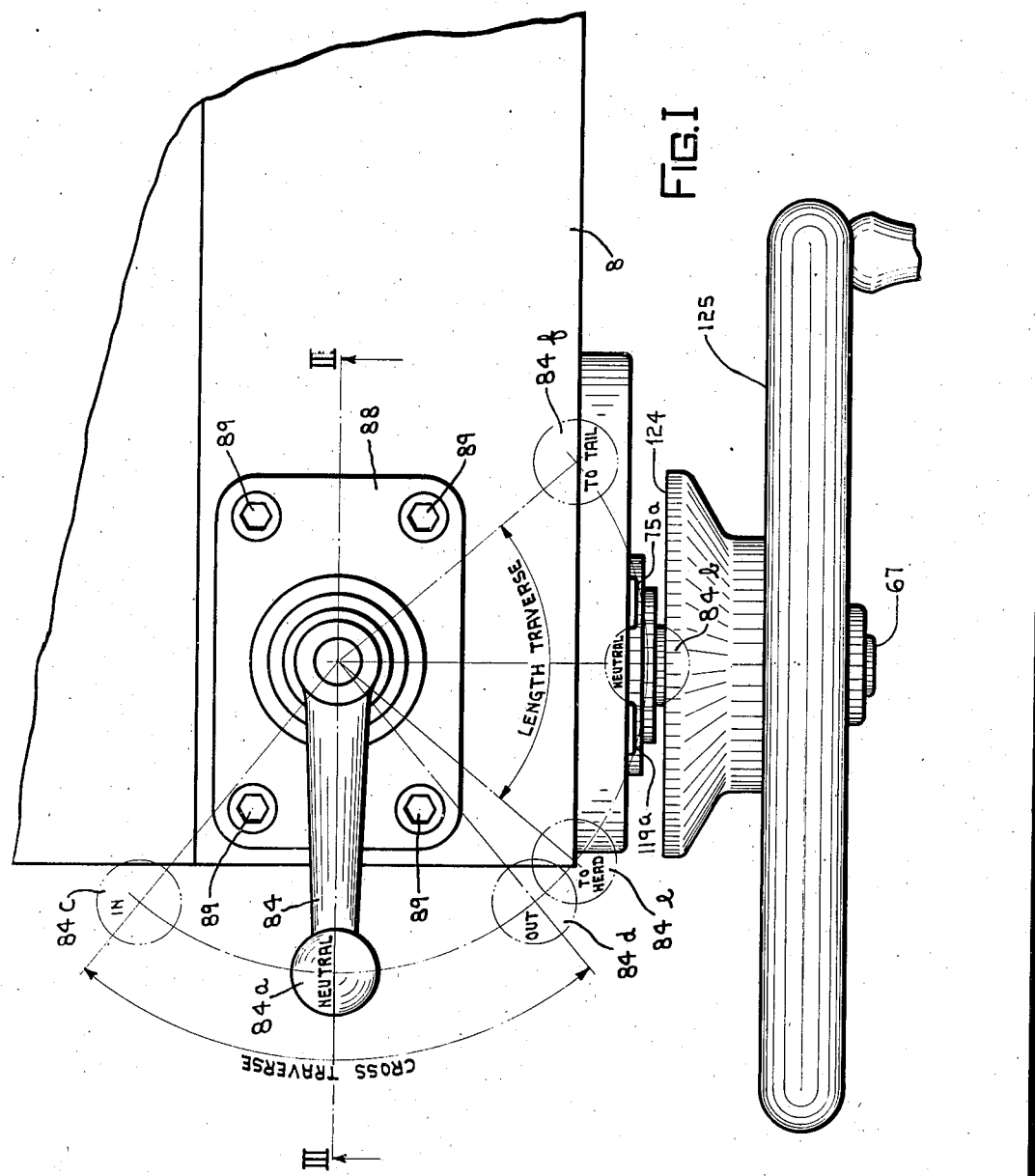
INVENTORS.
HARRY C. KEMPER
ROGER R. RUZICKA
BY Willard S. Groen
ATTORNEY

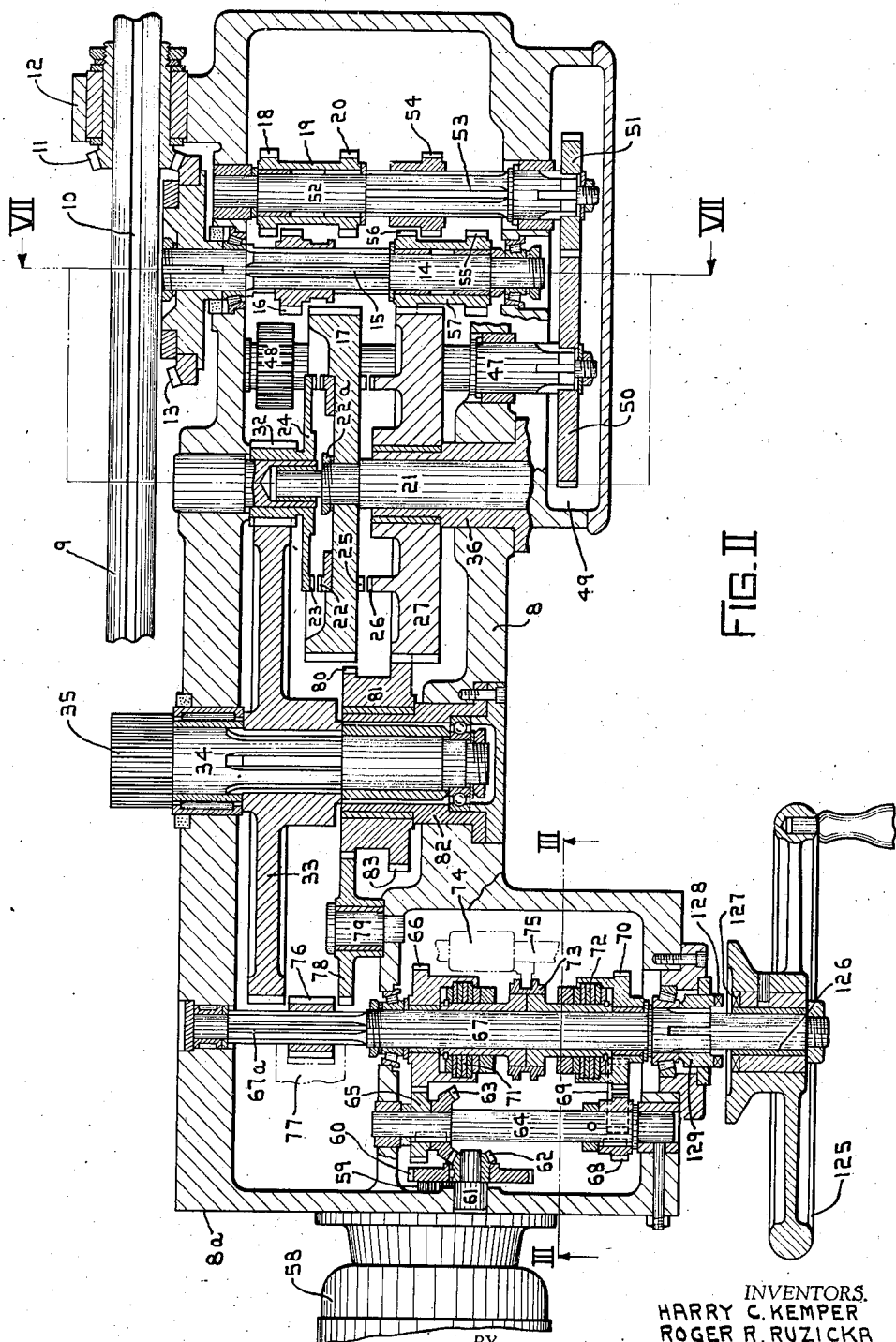
Fig. II

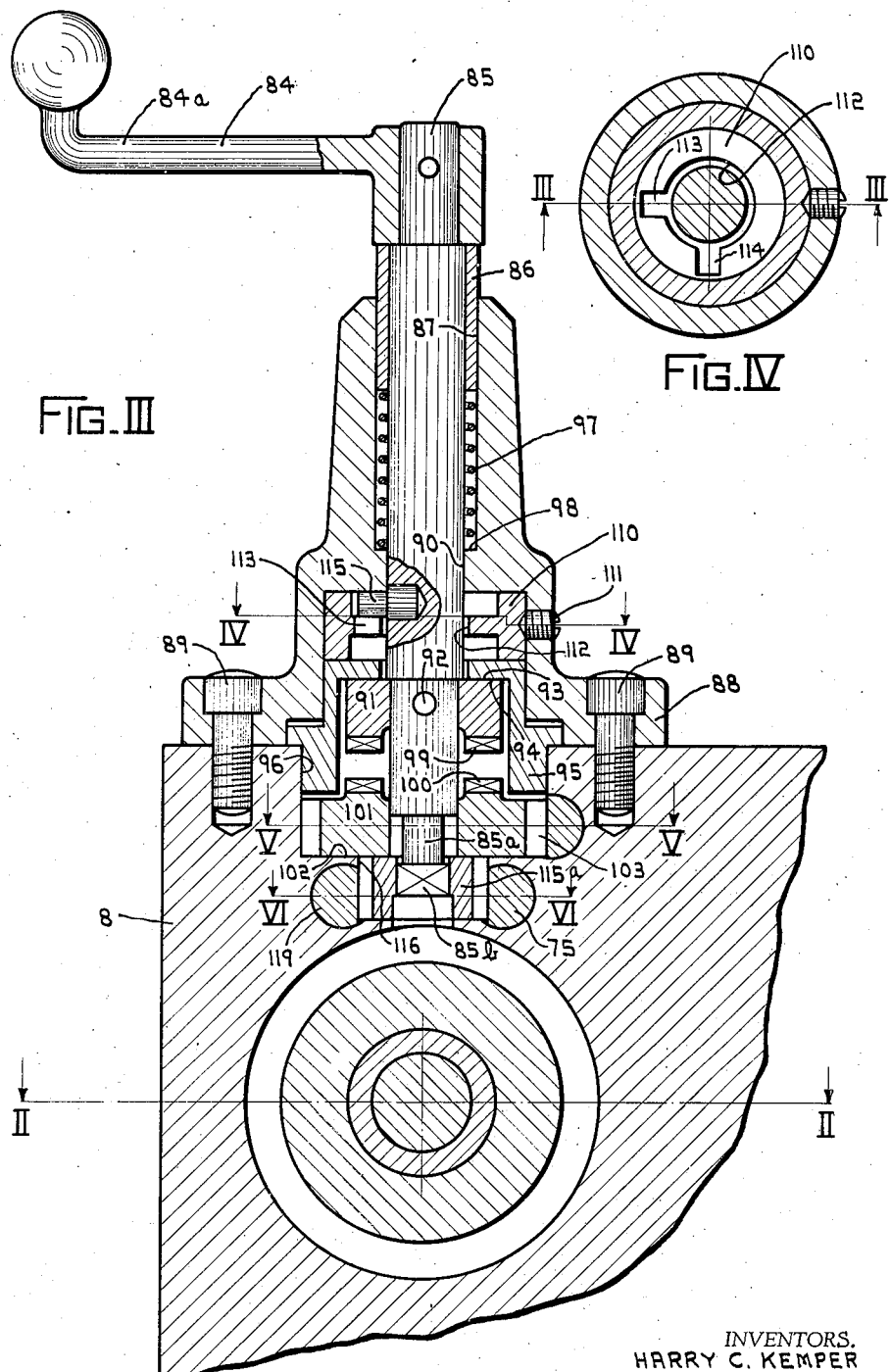

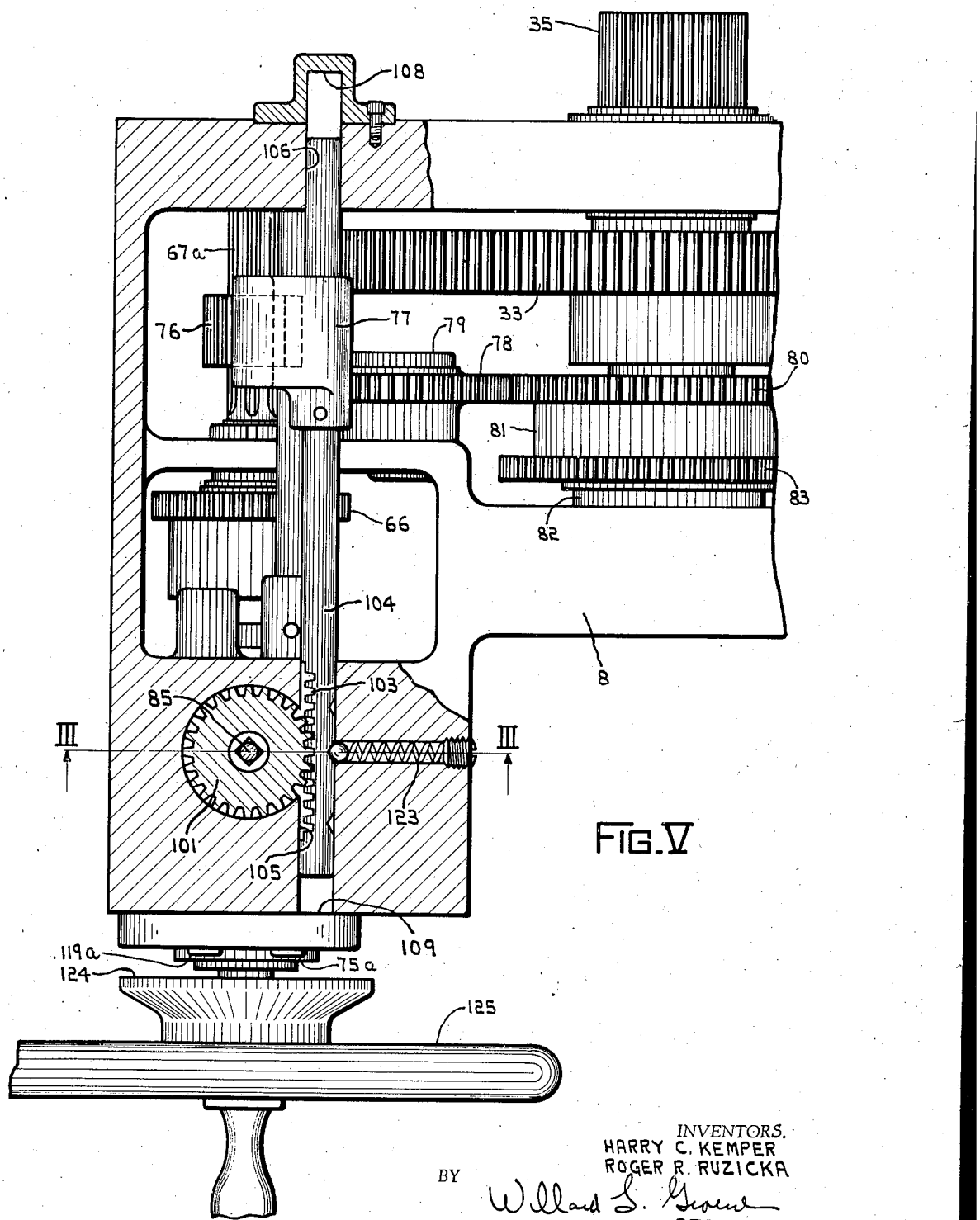
FIG. V
INVENTORS.
HARRY C. KEMPER
ROGER R. RUZICKA
BY Willard L. Groene
ATTORNEY July 25, 1944. H. C. KEMPER ET AL 2,354,266
MACHINE TOOL RAPID TRAVERSE MECHANISM
Filed Dec. 10, 1942 6 Sheets-Sheet 5
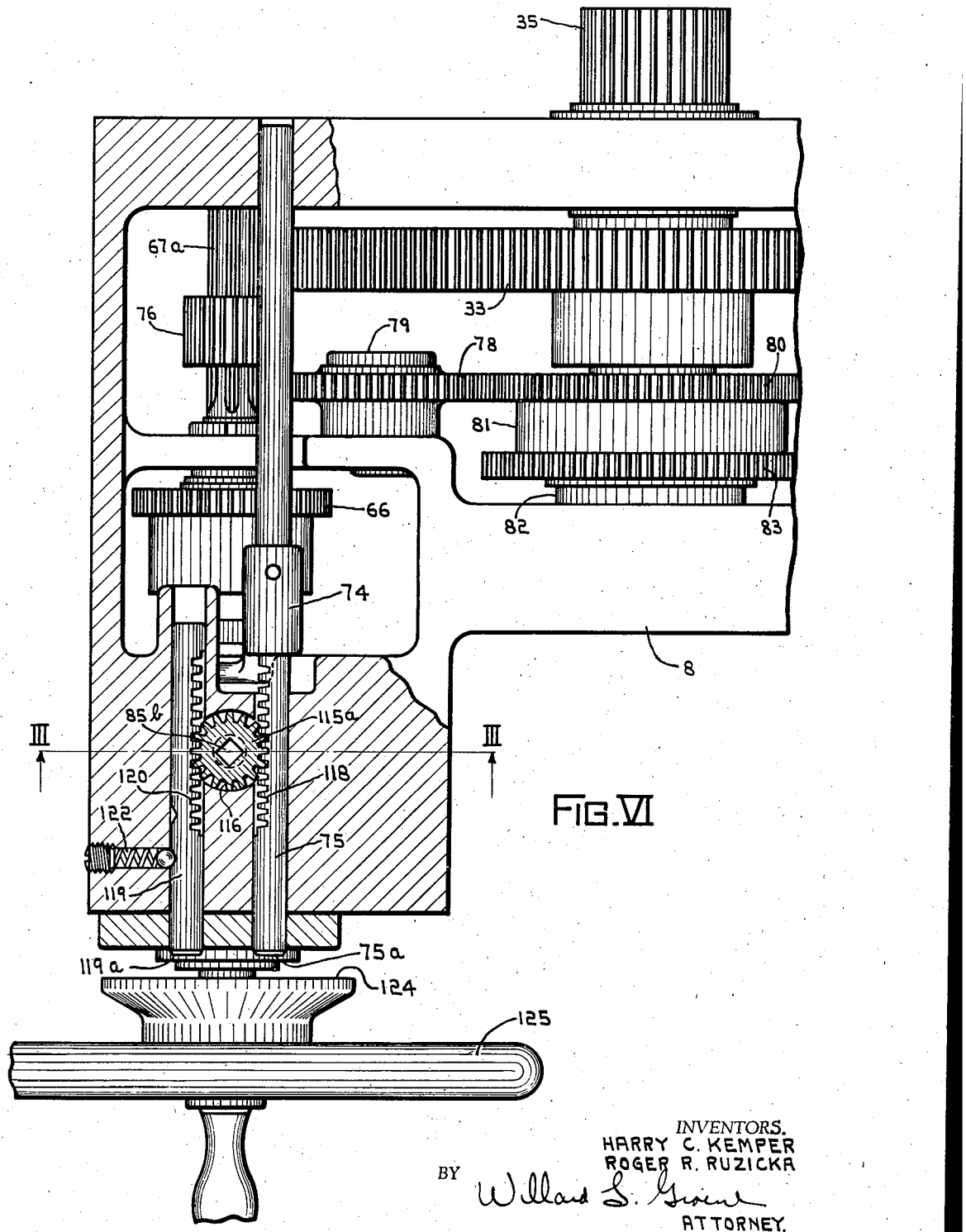
FIG. VI
INVENTORS.
HARRY C. KEMPER
ROGER R. RUZICKA
BY Willard S. Groine
ATTORNEY.

July 25, 1944.  H. C. KEMPER ET AL  2,354,266
MACHINE TOOL RAPID TRAVERSE MECHANISM
Filed Dec. 10, 1942  6 Sheets-Sheet 6
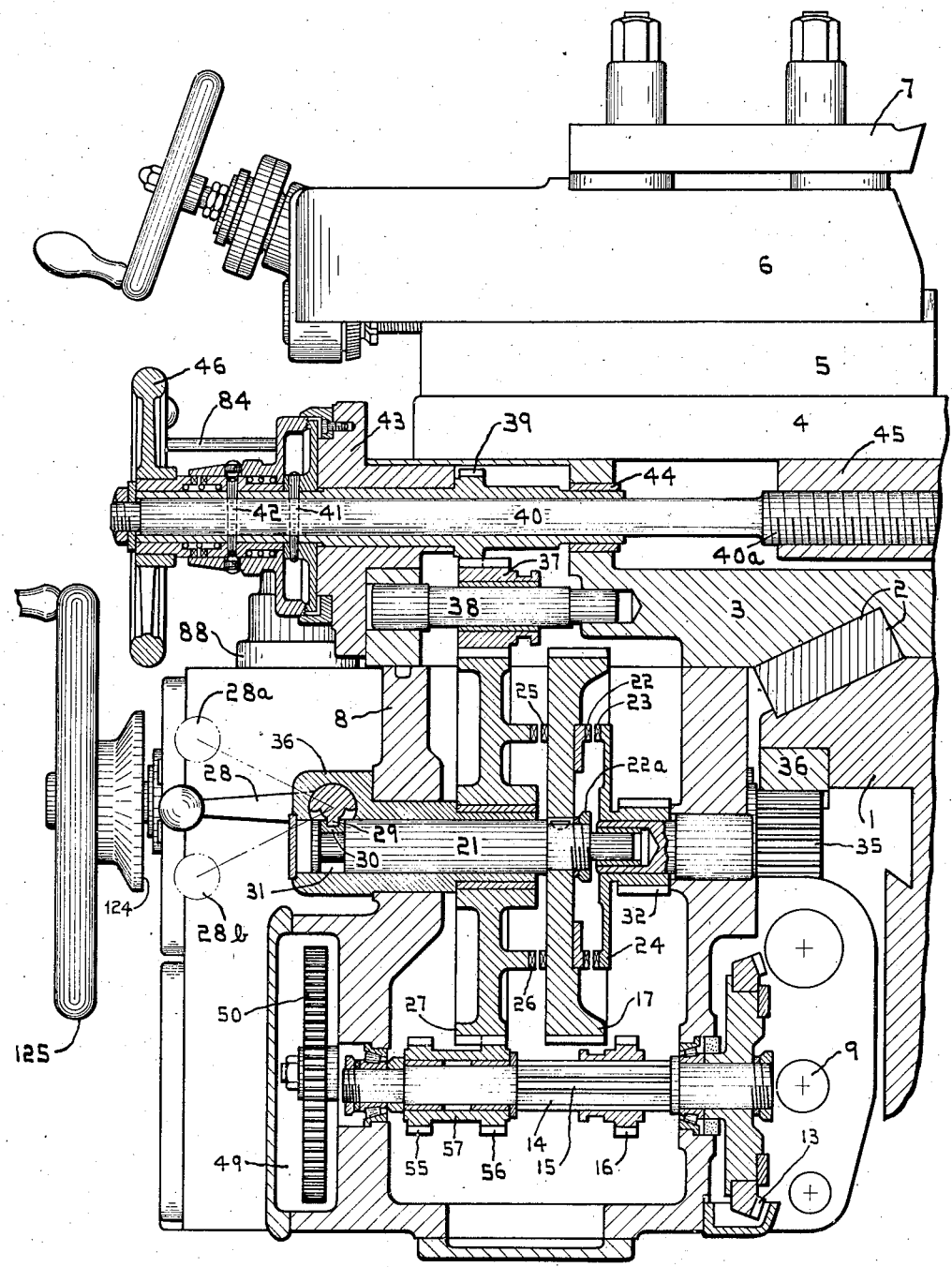
FIG. VII
INVENTORS.
HARRY C. KEMPER
ROGER R. RUZICKA
BY Willard S. Groen
ATTORNEY Patented July 25, 1944

UNITED STATES PATENT OFFICE 2,354,266

MACHINE TOOL RAPID TRAVERSE MECHANISM

Harry C. Kemper, Goshen Township, Clermount County, and Roger R. Ruzicka, Cincinnati, Ohio, assignors to The R. K. Le Blond Machine Tool Company, Cincinnati, Ohio, a corporation of Delaware Application December 10, 1942, Serial No. 468,518

8 Claims. (Cl. 82—22)

This invention pertains to machine tool rapid traverse mechanism and is particularly related to control and operating mechanism for effecting rapid traverse movement in the various movable work or tool members of machine tools. It is the primary purpose of this invention to provide control mechanism, for effecting rapid traverse movement in machine elements, comprising a control lever so arranged that the relative movement of the lever to effect the various traverse movement in the machine element is effected by moving the lever in a direction corresponding to the direction of movement of the various machine elements which are to be actuated at rapid traverse movement.

More particularly this invention is applicable to a machine tool having two movable elements movable at right angles to one another and a common single lever control apparatus associated with each of these members, which may be operated in such a manner as to cause the control lever to move in substantially identically the same direction as it is desired to move each of the respective machine elements.

More particularly this invention is applied to effecting the rapid traverse movement in a lathe carriage longitudinally of the bed and the cross slide crosswise of the bed. To accomplish the result of this invention it is desired to have a single control lever mounted on the carriage of the lathe so that it may be moved from a neutral position either toward the lathe spindle axis or away from the lathe spindle axis to effect the corresponding identical movements in the cross slide. It is then the object to provide an arrangement whereby the lever may be manipulated so as to cause it to be moved into a new plane of movement corresponding to the same direction of movement as that of the lathe carriage longitudinally of the bed and then to effect movement of this lever in this new oriented position of carriage travel either toward the headstock or toward the tailstock of the lathe to effect the corresponding rapid traversing of the carriage of the lathe.

Further features and advantages of this invention will appear from the detailed description of the drawings in which:

Figure I is an enlarged fragmentary view of a lathe carriage showing the arrangement and mode of operation of the single lever control for effecting both the length traverse and cross traverse for the lathe carriage and cross slide.

Figure II is a diagrammatic sectional view through a typical lathe apron transmission mechanism and rapid traverse mechanism associated with the control lever of Figure I, shown on the line II—II of Figure III.

Figure III is an enlarged vertical section through the single lever control mechanism for the rapid traverse on the line III—III of Figures I, II, IV, V, and VI.

Figure IV is a fragmentary section on the line IV—IV of Figure III, showing the notched bushing for determining the position of operation of the control lever for effecting either the cross traverse motion or the length traverse motion for the cross slide and carriage of the lathe.

Figure V is an enlarged horizontal section on the line V—V of Figure III, particularly showing the rack and pinion mechanism and clutch gear associated with the control lever for actuating the gear for selecting the longitudinal or cross feed power transmission.

Figure VI is a similar horizontal enlarged section on the line VI—VI of Figure III, particularly showing the actuating mechanism for effecting the reversal of the rapid traverse motion for either the cross slide or carriage of the lathe by manipulation of the control lever to either of its reverse or forward positions for each of the two positions of cross or longitudinal traverse.

Figure VII is a diagrammatic vertical sectional view of the lathe carriage, cross slide, and apron mechanism on the line VII—VII of Figure II.

For exemplary purposes this invention is shown applied to the manipulation in rapid traverse movement of the carriage and cross slide of a lathe. Noting particularly Figure VII the lathe has a bed 1 with appropriate ways 2 upon which is longitudinally slidably mounted the carriage 3 and on top of this carriage 3 is a cross slide 4 which slides in and out relative to the work spindle of the lathe. On top of the cross slide is the usual compound rest 5 and tool slide 6 carrying a suitable cutting tool 7.

Depending from the front portion of the carriage 3 is the lathe apron 8 which carries the power transmission gearing and control mechanism for actuating the carriage and cross slide in their respective feed and rapid traverse movements. Power for driving the apron transmission is received from the feed rod 9 which is appropriately connected in conventional manner to the usual lathe headstock power transmission and this rod 9 extends longitudinally of the front of the bed 1 of the lathe and has a splined portion 10 which slidably engages in a bevel gear 11 journaled against axial movement in a projecting lug 12 of the lathe apron 8. In this way power is transmitted at all times to the gear 11 for any position the apron may be located along the length of the bed.

The bevel gear 11 is connected in driving relationship with a bevel gear 13 fixed on the input shaft 14 journaled in the lathe apron 8. Formed on this shaft 14 is a splined portion 15 upon which is drivingly mounted for sliding movement the pinion 16 which may be slid into direct driving engagement with a clutch gear 17 or into engagement with a gear 18 of a double gear 19 having the second gear in engagement with the gear 17. The gear 16 may also be moved to a neutral position as shown in Figure II. In this way reversal of rotation of drive from the feed rod 9 to the gear 17 may be effected.

The clutch gear 17 is rigidly fixed to the slidable shifter shaft 21 by a suitable nut 22a and may be axially slid so as to cause its clutch teeth 22 to engage the clutch teeth 23 of the clutch member 24 and be slid in the opposite direction to cause its clutch teeth 25 to engage the clutch teeth 26 of the gear 27 by manipulation of the feed selector handle 28 having a tooth 29 engaging a shoe 30 in the annular slot 31 of the shaft 21 as best seen in Figure VII.

The clutch member 24 has a pinion 32 which engages the rack pinion gear 33 fixed on the rack pinion shaft 34 having the rack pinion 35 which operates in the rack 36 fixed to bed 1 as seen in Figure VII. The gear 27 which is journaled on a bushing 36 fixed in the apron housing 8 engages in a pinion 37 which is journaled on a stud 38 and in turn is connected in driving relationship to the pinion 39 fixed on the cross feed screw 40 by suitable pins 41 and 42. This pinion, of course, is appropriately journaled in a bracket 43 and in a bearing 44 comprising part of the carriage 3 of the lathe and has a threaded portion 40a operating in the cross feed nut 45 appropriately fixed at the bottom of the cross slide 4 and having a handwheel 46 on its outer end for manually rotating the screw 40 adjusting the cross slide in the conventional manner.

It will thus be apparent by appropriately manipulating the lever 28 so as to move it to the position 28a the clutch teeth 25 of gear 17 will be engaged with the clutch teeth 26 of gear 27 so that power from the feed rod 9 will be transmitted through the gear 27 to the cross feed screw 40 to effect cross slide feed motion. Similarly when the control lever 28 is moved to position 28b the clutch teeth 22 and 23 will be brought into engagement and feeding power from the feed rod 9 will be transmitted to the rack pinion 35 to cause the longitudinal feeding of the carriage on the bed of the lathe.

Incorporated in this apron mechanism is also means for effecting the simultaneous operation of the cross and longitudinal feeding motion for taper turning operations. In the apron 8, Figure II, is a shaft 47 having a gear 48 which is in constant mesh with the gear 33 of the rack pinion shaft 34 and which proceeds outwardly toward the front of the apron into a change gear cavity 49 and carries on it an appropriate change gear 50 which is adapted to engage an appropriate mating change gear 51 on a shaft 52 also journaled in the lathe apron. On this shaft 52 is a splined portion 53 which is slidably carried in driving relationship with the pinion 54 which may be engaged directly with the gear 27 or may be engaged in reversing driving relationship therewith through the gears 55 and 56 of the double gear 57 on the shaft 14. In this way, with the gear 17 moved to the neutral position with handle 28 in the position shown in full lines in Figure VII, with the gear 17 in engagement with the clutch member 24, power from the feed rod 9 will be transmitted from the shaft 14 to the gear 16 to the gear 17 to in this way cause rotation of the rack pinion for longitudinal movement of the lathe apron and carriage along the bed. Similarly the power take-off from the gear 33 to the gear 48 and shaft 47 to the change gears 50—51 and the gear 54 directly to the gear 27 or to the double gear 57 will cause this gear 27 to rotate and at the same time effect actuation of the cross feed screw 40 in timed relationship and simultaneously with movement of the carriage along the bed of the lathe, to in this way effect taper cutting operation in the usual manner. Appropriate control levers (not shown) may be provided for actuating the gear 16 on the shaft 14 to its respective position and another lever for the gear 54 on the shaft 52 in its respective position.

Rapid power traverse is provided in association with the above transmission mechanism whereby the carriage or cross slide may be actuated at rapid traverse movement either independently or simultaneously and this rapid traverse motion may be effected through the medium of the single control lever which is operable in position corresponding to the position of movement of the respective carriage and cross slide. Power for the rapid traverse movement is derived from the motor 58 fitted rigidly to the left hand face 8a of the apron 8, as best seen in Figure II, and it has a pinion 59 which is connected to gear 60 journaled on a stud 61 fixed in the apron housing 8 and also connected to a bevel gear 62 which in turn drives a bevel gear 63 fixed on the shaft 64 appropriately journaled in the lathe apron 8. A gear 65 fixed to the shaft 64 in driving relationship to the bevel gear 63 is directly connected to a clutch gear 66 journaled on the longitudinal hand wheel shaft 67 journaled in the lathe apron 8. A gear 68 fixed to the shaft 64 drives through an appropriate idler gear 69 journaled in the apron 8 to the second clutch gear 70 also journaled on the hand wheel shaft 67. Both the gears 66 and 70 are arranged to be frictionally clutched by means of the respective clutches 71 and 72 in driving relationship on the shaft 67 by actuating the yoke 73 with the shifter member 74 on the shifter rod 75. Thus by engaging the clutch 71 the shaft 67 will be rotated in one direction by the motor 58 and by engaging the clutch 72 the shaft 67 will be driven in the opposite direction from this motor.

The plungers 119 and 75 of Figure VI project outwardly with their ends 119a and 75a arranged to engage the surface 124 of the hand wheel 125 journaled on a suitable bearing 126 on the shaft 67. Appropriate clutch teeth 127 are arranged to engage clutch teeth 128 of the clutch member 129 to the shaft 67 when the hand wheel is moved in toward the front of the lathe apron 8. It is to be noted, therefore, that actuation of the control lever to either position 84c or 84d or to position 84e or 84f will cause one or the other of the ends 119a or 75a to project outwardly and push the hand wheel outwardly on the shaft 67 so as to disengage the clutch members 127 and 128 when rapid traversing motion is applied to the shaft 67. This is done so as to prevent the rapid rotation of the hand wheel which would cause injury to the operator in its fast spinning motion and would also add unnecessary momentum of the hand wheel 125 and create excessive inertia to the lathe apron mechanism in effecting the starting and stopping of the rapid traverse motion thereof.

Slidably mounted in driving relationship on the splined portion 67a of the shaft 67 is the pinion 76 which may be slid by the shifter yoke 77 into driving engagement with the gear 33 so as to in this way connect rapid traverse power to the rack pinion 35 for longitudinal rapid traversing of the lathe apron and carriage in either direction along the bed. The gear 76 may also be shifted into engagement with the idler gear 78 journaled on a stud 79 fixed in the lathe apron 8 and which is connected to a gear 80 of a compound gear 81 journaled on a suitable bushing 82 fixed in the lathe apron 8 around the rack pinion shaft 34 and which has a gear 83 which is in driving relationship with the gear 27. Thus in the latter case when the gear 76 is shifted into engagement with the gear 78 reversible rapid traverse power may be applied to the gear 27 and thus to the cross feed screw 40 actuating the cross slide in rapid traverse motion in either direction.

The clutches 71 and 72 and the gear 76 may be operated in a predetermined sequence to effect the rapid traverse movement of the carriage and cross slide by means of the single control lever 84 which is mounted rigidly to a rock shaft 85, Figure III, supported by a bushing 86 in a bearing 87 in the upper portion of a bracket 88 fixed to the top surface of the lathe apron 8 by appropriate screws 89. The shaft 85 is also guided in an appropriate bearing 90 formed in the center portion of the bracket 88. On the lower portion of this rock shaft 85 is fixed a clutch piece 91 by a suitable pin 92 and the upper surface 93 of this clutch piece 91 normally engages the surface 94 of a bushing 95 held in place in a bore 96 formed in the lathe apron 8 by the bracket 88. This engagement of the surface 93 with the surface 94 is normally maintained by means of the compression spring 97 engaging the lower end of the bushing 86 and the surface 98 of the bore 87 in the bracket 88.

The clutch piece 91 has clutch teeth 99 which are arranged to engage clutch teeth 100 of a gear 101, the latter being journaled in the bore 96 in the apron 8 and resting downwardly on a surface 102 of said bore 96. The clutch teeth 99 and 100 are so arranged that they may be engaged in only two positions 90° circumferentially spaced from one another. In other words the lever 84 on the shaft 85 may be pushed downwardly as shown in Figures I and III to engage these clutch teeth and the only other provision where this lever could be engaged and could cause these teeth to be engaged would be a position 90° circumferentially removed therefrom. This gear 101 is in mesh with a rack 103, Figure V, formed on a shifter rod 104 slidably mounted in suitable bearings 105 and 106 formed in the walls of the apron 8 of the lathe. On this rod 104 is fixed the shifter yoke 77 which reaches down each side of the gear 76 on shaft 67 so that axial sliding of this rod 104 will effect the shifting of the gear 76 either into engagement with the gear 33 or with the gear 78 for effecting respectively the longitudinal traversing of the apron carriage or the cross slide traversing. Appropriate stopping means 108 and 109 accurately limit the motion of the rod 104 and through the medium of the gear 101 the rocking of the shaft 85 is maintained within predetermined limits of rocking motion, in this particular instance 90°, constituting the limits of movement of the handle 84 from the position 84a into the position 84b.

In order to limit the point where the lever 84 and the shaft 85 may be pushed downwardly against the spring 97 to engage the clutch teeth 99—100 to the position 84a or the position 84b an indexing and locating collar 110 shown in Figures III and IV is mounted in the bracket 88 and held in place by the bushing 95 and a set screw 111 and has formed in it a bore 112 through which passes the rock shaft 85 and in this bore are two cut-out slots 113 and 114 in which may operate a squared end pin 115 fixed in the rock shaft 85 as best seen in Figure III. Thus only when the control lever 84 is in the position 84a or the position 84b is the pin 115 lined up with the respective slots 113 and 114 to permit the lever 84 and its shaft 85 to be pressed downwardly for engaging the clutch teeth 99—100.

The lower end of the shaft 85 has a cylindrical downwardly projecting portion 85a having a squared end portion 85b nicely fitting in a mating square hole in the gear 115a, which gear is carried in a counter bore 116 of the bore 96 and simultaneously engages a shifter rod 75 by means of a rack 118 and a second plunger 119 through the medium of the rack 120. On the rod 75 is a shifter yoke 74 which engages the clutch operating spool 73, Figure II, for respectively actuating the clutches 71 and 72 by axial motion of the rod 75 when the gear 115a is rotated by the shaft 85 when in the upper position of engagement of its squared end 85b in the bore of the gear as shown in Figure III. The motion of the yoke 73 is limited by the design of the clutches 71 and 72 so that when the control lever 84 is in the position shown in Figures I and III the rocking motion of this lever and shaft 85 when in the upward position will be from the position 84c to 84d. Now when the control lever 84 is depressed at the point 84a so that the pin 115 in shaft 85 passes down through the slot 113 in the bushing 110 engaging the clutch teeth 99 and 100, the squared end portion 85b of the shaft 85 will be pushed out of the square hole of the gear 115a so that the shaft 85 may rotate without turning the gear 115a; the rods 75 and 119 being held in neutral position by the detent 122 shown best in Figure VI. Thus the shaft 85 may be rocked by the lever 84 from position 84a to position 84b to turn the gear 101 which will engage the gear 76, Figure II, with the gear 33 connecting up the shaft 67 with the longitudinal movement of the carriage and apron. As soon as the lever arrives at the position 84b the pin 115 will be in alignment with the slot 114 of the bushing 110 so that the shaft 85 may again be allowed to come upwardly under the influence of the spring 97. This will again reinsert the squared end portion 85b of the shaft 85 in the gear 115a but in the new position, in this instance 90° removed from the previous position 84a so as to again attach this gear 115a positively to the shaft 85. This upward motion again disengages the clutches 99—100 so that now when the lever is rotated from its position 84b to position 84e or 84f the respective clutches 71 and 72 will again be actuated to move the carriage and apron in longitudinal rapid traverse motion in either direction along the bed. Appropriate detent means 123 seen in Figure V serves to normally hold the rod 104 and its gear 76 in engagement with either the gear 33 or in engagement with the gear 78 when the lever has been allowed to move upward disengaging the clutch teeth 99—100 so that manipulation of the gear 115a for effecting traverse power in either direction will not cause any disengagement of the gear 76 in either of its selected positions of engagement with gear 33 or gear 78.

It is to be further noted in connection with this novel operating mechanism that the single handle control lever 84 is arranged to be operative at all times either for the cross feed rapid traverse or the length traverse in the same horizontal plane of operation but that it is arranged to be repositioned to coincide with the direction of travel of the member to be actuated when changing from one member operating in one direction and another member operating perpendicularly thereto. In other words, as in this particular illustrative example, when it is desired to operate the cross feed for the machine the lever takes the positions 84a, 84c, or 84d, movement from position 84a to either of these positions being in the direction of motion of the cross slide rapid traverse. Similarly when it is desired to actuate the carriage and apron in longitudinal rapid traversing motion the lever is repositioned as described for automatically effecting movement from position 84b to 84e or 84f corresponding again substantially identically to the axial direction of travel of the apron and carriage to be effected. In this way the control lever is maintained in a definite operating plane and is also repositioned for automatically effecting movement in direct association with the movement of the member actuated in rapid traverse motion to in this way greatly facilitate the ease of operation of the machine and eliminate confusion upon the part of the operator in actuating such mechanism. Likewise a single lever is provided for effecting both of these motions and is coordinated with their motion in this way to provide a most efficient and easily understood and operated mechanism not entailing great skill and care upon the part of the operator to prevent damage to the machine tool which would necessarily occur in apparatus of this type while rapid motions are being effected.

Summarizing the operation of this device more specifically, actuation of the control lever 84 in horizontal swinging motion in a predetermined plane is effective for controlling the direction and application of the rapid traverse power and its motion in the direction desired indicates the direction the machine tool member will be moved. Pushing the lever down and moving it to a position where it will move in the direction of another member to be actuated will reposition it automatically for effecting the rapid traversing of this second mentioned member. Thus, referring to Figure III, rocking of the lever 84 for rocking the gear 115a is for the purpose of initiating and determining the direction of rapid traverse power to the member to be actuated. Repositioning of the lever 84 by depressing it and the spring 97 to engage the clutch members 99—100 serves to reposition the handle in direct line of movement with the member to be moved and simultaneously effect the transmission mechanism of the rapid traverse so as to carry out the actuation of the member in exact movement with that of the direction of movement of the lever.

It is to be also noted that when the combined longitudinal and cross feeding movements are instituted by engagement of gear 17 with clutch member 24 and with gear 54 driving the gear 27, Figure II, the control lever 84 can effect rapid traverse simultaneously of both of these movements so that in taper cutting, rapid traversing of the tool back along the taper can be undertaken without difficulty. It is to be noted that the control lever 84 may be operated in either of the positions 84b to 84d or 84e to 84f accomplishing the same result in both instances, though it is preferable to operate it in the length traverse position with the gear 76 engaged with the gear 33 to get the most efficient and best drive for the entire lathe apron and cross slide transmission mechanism when operating the longitudinal and cross feed movements simultaneously.

Having thus fully set forth and described our invention what we claim is new and desire to secure by United States Letters Patent is:

1. In a lathe, a carriage, a cross slide on said carriage, rapid traverse mechanism for actuating said carriage and cross slide in rapid traverse movement, means for alternately connecting said rapid traverse mechanism to said carriage or said cross slide, means for reversibly effecting the driving power to said carriage or cross slide, a single control lever mechanism associated with said interconnecting means for the carriage and cross slide and said reversing means associated therewith for operating them in a predetermined sequential relationship, means for operating said control lever in a direction corresponding to the direction of rapid traverse of said carriage and cross slide, means for maintaining said control lever, while operable for effecting the rapid traversing motion of either the carriage or cross slide in a common plane on swinging movement, means for repositioning said handle so that its movement will correspond to the direction of movement of the member to be rapid traversed comprising means permitting the depressing of said handle and moving it to its new oriented position, and means permitting it to rise again into said common plane of movement for effecting said rapid traverse motions.

2. In a lathe, a carriage, an apron mounted on said carriage, a cross slide mounted on said carriage, apron transmission mechanism associated with said carriage and cross slide, rapid traverse transmission mechanism in said apron associated with said apron transmission mechanism having means for alternately engaging the rapid traverse mechanism with said carriage or cross slide, reversible power transmission mechanism associated with said rapid traverse mechanism for causing reversal of traversing motion in said carriage or cross slide, a single lever control apparatus mounted on said apron comprising a control lever swinging into segmental paths in a direction corresponding to the direction of traverse movement of said carriage in one segment and having a direction of movement corresponding to the direction of traverse of said cross slide in the other segment, and means for moving said lever in the same horizontal plane in both positions of carriage and cross slide travel, each side of a neutral position, for each segment, for initiating the rapid traverse movement in the corresponding member in one direction or the other.

3. In a lathe, a carriage, an apron mounted on said carriage, a cross slide mounted on said carriage, apron transmission mechanism associated with said carriage and cross slide, rapid traverse transmission mechanism in said apron associated with said apron transmission mechanism having means for alternately engaging the rapid traverse mechanism with said carriage or cross slide, reversible power transmission mechanism associated with said rapid traverse mechanism for causing reversal of traversing motion in said carriage or cross slide, a single lever control apparatus mounted on said apron having a control lever movable in a direction corresponding to the direction of traverse movement of said carriage and having a direction of movement corresponding to the direction of traverse of said cross slide, means confining the movement of said lever to the same horizontal plane in both positions of carriage and cross slide travel, each side of a neutral position for initiating the rapid traverse movement in the corresponding member in one direction or the other, repositioning means associated with said control lever permitting depressing of said lever and swinging it to the position of movement desired for said carriage or cross slide means to return said handle to the common plane of operativeness for initiating the rapid traverse movement.

4. In a power transmission and control mechanism, a source of power, means for reversibly connecting said source of power to an output shaft, means on said output shaft for alternately connecting said shaft to one or the other of a pair of members to be driven, a single control lever associated with said reversing means and connecting means for operating same in a predetermined sequential relationship, means for operating said single control lever in a common plane in two different directions corresponding to the two members to be actuated by the connecting means, and means operable by depressing said lever to a lower plane and rotating it to a new operative position therein to effect connection of one or the other of said members to said shaft.

5. In a single lever control mechanism, a prime mover, a pair of reversing clutch mechanisms connecting said prime mover to a power shaft, means on said shaft for alternately connecting said shaft to one or the other of two members to be driven, a single control lever associated with said reversing mechanisms and connecting means, actuating mechanism associated with said control lever for rendering said reversing mechanism operative by swinging said lever in a predetermined horizontal plane from one side to the other of a neutral position, means operable by depressing said lever below said predetermined plane and swinging it to a new oriented circumferential position for effecting the connecting of the output shaft to one or the other of said members to be driven, and means operable by raising of said lever to said predetermined plane of operation to again institute the reversible power transmission to the member engaged by the means for alternately connecting said shaft to one or the other of the driven members.

6. In a single lever control mechanism, a prime mover, a pair of reversing clutch mechanisms connecting said prime mover to a power shaft, means on said shaft for alternately connecting said shaft to one or the other of two members to be driven, a single control lever associated with said reversing mechanisms and connecting means, actuating mechanism associated with said control lever for rendering said reversing mechanism operative by swinging said lever in a predetermined horizontal plane from one side to the other of a neutral position, means whereby depressing of said lever below said predetermined plane and swinging it to a new oriented circumferential position effects the connecting means to connect said shaft to one or the other of said members to be driven, and means whereby release of said lever again permits said lever to rise to said predetermined plane of operation for again instituting the reversible power transmission to the member connected to said output shaft, and means whereby said control lever is ineffective to operate said reversing mechanism when said output shaft is being reconnected to one or the other of said members to be driven.

7. In a single lever control mechanism, a prime mover, a pair of reversing clutch mechanisms connecting said prime mover to a power shaft, means on said shaft for alternately connecting said shaft to one or the other of two members to be driven, a single control lever associated with said reversing mechanisms and connecting means, actuating mechanism associated with said control lever for rendering said reversing mechanism operative by swinging said lever in a predetermined horizontal plane from one side to the other of a neutral position, means whereby depressing of said lever below said predetermined plane and swinging it to a new oriented circumferential position effects the connecting means to connect said shaft to one or the other of said members to be driven, and means whereby release of said lever again permits said lever to rise to said predetermined plane of operation for again instituting the reversible power transmission to the member connected to said shaft, and means whereby said control lever is ineffective to operate said reversing mechanism when said output shaft is being reconnected to one or the other of said members to be driven, and means whereby said control lever, when operated in a depressed position below said predetermined plane for effecting reconnection of said shaft with one or the other of said members to be driven, is ineffective to control the reversible power transmission mechanism.

8. In a lathe apron transmission mechanism, a rapid traverse motor, a longitudinal movement hand wheel shaft, a hand wheel journaled on said shaft and clutchable therewith, a pair of reversing clutch mechanisms mounted on said hand wheel shaft, a shifter yoke for actuating said clutches alternately for connecting said rapid traverse motor for driving said shaft in one direction or the other, a shiftable gear mechanism on said shaft for alternately connecting power therefrom to the longitudinal or cross feed movement of said lathe, a tool carriage and cross slide, a single control lever mounted on said apron operable in a predetermined horizontal plane and in a direction corresponding to the movement of said carriage and cross slide for effecting the operation of said rapid traverse power from said motor to said carriage and cross slide in one direction or the other by actuating said reversible clutch mechanism, means whereby said lever may be depressed and swung to a new operative position corresponding to the position desired for said carriage or cross slide whereby said connecting gearing may be connected to said carriage or cross slide actuating mechanism, and means whereby said hand wheel may be engaged with said hand wheel shaft for rotating said shaft manually when said rapid traverse mechanism is in neutral position with both of said reversing clutch mechanisms inoperative, and means whereby actuation of said lever to render one or the other of said clutches operative automatically disengages said hand wheel from connection with said shaft.

HARRY C. KEMPER.
ROGER R. RUZICKA.